June 5, 1962  J. C. BECKETT  3,038,118
ION COLLECTING AND MEASURING APPARATUS
Filed July 21, 1958
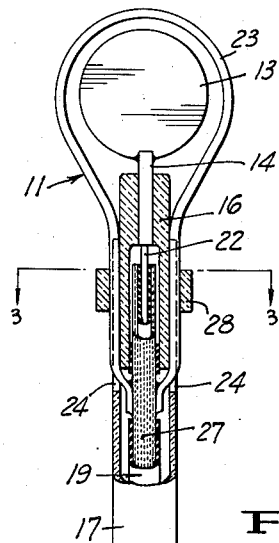
FIG_1_
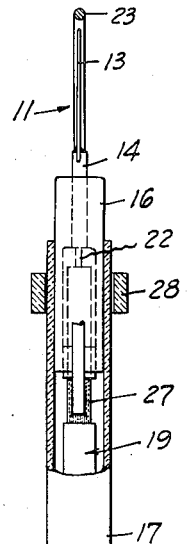
FIG_2_
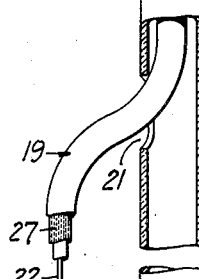
FIG_3_
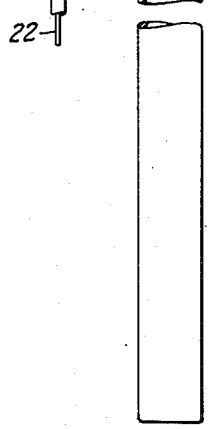
FIG_5_
FIG_4_
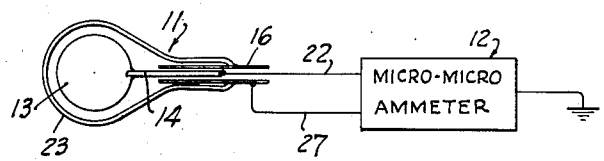
INVENTOR.
John C. Beckett
BY
*Fisher and Swain*
ATTORNEYS United States Patent Office 3,038,118
Patented June 5, 1962

3,038,118
ION COLLECTING AND MEASURING APPARATUS
John C. Beckett, Kentfield, Calif., assignor, by mesne assignments, to Wesix Electric Heater Co., San Francisco, Calif., a corporation of California
Filed July 21, 1958, Ser. No. 749,902
8 Claims. (Cl. 324—33)

This invention relates to collecting and measuring apparatus and more particularly to ion collecting and measuring apparatus.

Heretofore, it has been difficult to obtain accurate indications of the presence of ions and the measurement of the number of ions present in a certain area or contacting or striking a certain surface. To obtain accurate measurement, it is desirable that the electrostatic field in which the measurement or indication is to be obtained is not disturbed by the apparatus being utilized.

In general, it is an object of the present invention to provide ion collecting and measuring apparatus of the above character which makes possible accurate detection and measurement of ions.

Another object of the invention is to provide apparatus of the above character which will cause a minimum of distortion of the electrostatic field during ion detection or measurement.

Another object of the invention is to provide apparatus of the above character which prevents extraneous electric fields from inducing unwanted currents or voltages in the apparatus.

Another object of the invention is to provide apparatus of the above character in which no separate ion source is required.

Another object of the invention is to provide apparatus of the above character which can be readily used and which is relatively inexpensive.

Additional objects and features of the invention will appear from the following description in which the preferred embodiment has been set forth in detail in conjunction with the accompanying drawings.

Referring to the drawings:

FIGURE 1 is a front plan view of the collecting device.
FIGURE 2 is a side elevational view.
FIGURE 3 is a cross-sectional view taken along the line 3—3 of FIGURE 1.
FIGURE 4 is a circuit diagram for the apparatus.
FIGURE 5 is a side elevational view of a portion, part of which is in cross-section, of another embodiment of my invention.

In general, the present invention consists of a collecting element of conducting material. The collecting element is connected to means for giving an indication of whether or not ions are being collected by the collecting element or to means which gives a measurement of the number of ions being collected by the collecting element. The collecting element is provided with means for preventing the collecting element from disturbing the electrostatic field to ensure that a correct indication or measurement will be made.

The ion collecting and measuring apparatus shown in the drawing consists of a collecting device 11 and indicating or measuring means 12 connected to the collecting device and serving to give an indication of whether or not ions are being collected and the number of ions being collected.

The collecting device 11 consists of a collecting element 13 which may be of any suitable shape but is preferably of a shape which will permit easy calculation of the ion density as hereinafter described. For example, as shown, the collecting element can be in the form of a disc. It is made of a suitable conducting material such as stainless steel. The collecting element 13 is mounted upon a rod 14 of conducting material. The rod 14 is carried by and extends through a cylindrical mounting member 16. The mounting member 16 is mounted within the upper end of a hollow tubular member 17 which serves as a staff or handle as hereinafter described. The mounting member 16 and the tubular member 17 can be made of any suitable high quality insulating materials such as polyethylene.

A coaxial shielded cable 19 extends through an opening 21 intermediate the ends of the tubular member 17 and has its central conductor 22 connected to the rod 14. A wire guard and shield 23 is looped about the collecting element 13 and lies in the same plane as the collecting element 13. The ends of the guard or shield are seated in grooves or slots 24 on opposite sides of the tubular member 17 and are connected to the shielding 27 of the cable. A band 28 of suitable material such as polyethylene is mounted on the upper end of the tubular member 17 and serves to hold the intermediate portions of the wire guard or shield in the grooves 24.

The coaxial cable 19 is connected to the indicating or measuring means 12. The indicating or measuring means may be of any conventional type but preferably should be a micro-micro ammeter. One type of micro-micro ammeter found to be suitable is the model 200 Electrometer equipped with a $10^{12}$ ohm shunt and manufactured by Keithley Instruments of Cleveland, Ohio. Another suitable micro-micro ammeter is the "Ultrohmeter" manufactured by Beckman Instruments. The central conductor of the coaxial cable is connected to the proper terminal of the instrument whereas the shielding is connected to the ground terminal of the instrument.

Operation of my ion collecting and measuring apparatus may now be briefly described as follows: When it is desired to make a reading of the number of ions striking or contacting a given surface area, the micro-micro ammeter is placed in operation and the lower end of the tubular member or staff 17 is grasped by one hand. The collecting device is held in such a manner that the collecting element is disposed in a plane parallel and adjacent to the surface or area adjacent which it is desired to take a reading. If an excess of one polarity of ions is present, which is normally the case since some ions of one sign generally predominate in the atmosphere, an indication will be given on the indicating and measuring instrument 12.

The number of ions contacting the collecting element 13 can be determined by the current flow through the measuring instrument 12. In addition, it can be determined from observing on the instrument the polarity of the current flow whether an excess positive or negative ions are being collected.

Ions reaching the collecting element 13 can be measured in terms of ions/mm.$^2$/sec. as determined from the equation $$N = \frac{I}{qA}$$

where:
$N$=Number of ions/mm.$^2$/sec.
$I$=Ion current in amperes
$q$=Charge of one ion=$1.6 \times 10^{-19}$ coulombs
$A$=Area of probe in mm.$^2$ In making measurements to determine the number of ions contacting a certain flat surface, it is desirable that the collecting element 13 be maintained out of contact with the surface. By resting the band 28 upon the surface, the collecting element 13 is easily held a predetermined distance from the surface.

The wire guard and shield 23 is provided to keep the collecting element 13 as near ground potential as possible so that the number of ions that reach the collecting element will be approximately the same number of ions as would have reached the surface immediately behind or below the collecting element had the collecting element not been present. By maintaining the collecting member at or near ground potential, the electrostatic field adjacent the collecting element is not distorted. The wire guard or shield also prevents extraneous electric fields from inducing stray currents into the collecting element and into the collecting circuit which consists of the collecting element, the central conductor and the measuring instrument.

The wire guard or shield 23 should be placed as close as possible to the collecting element 13 so that the collecting element 13 will be maintained as close to ground potential as possible. However, the air space in between the collecting element 13 and the shield 23 should be sufficient to prevent significant current flow through the air between the shield and the collecting element. For example, in one embodiment of my invention found to operate satisfactorily, a spacing of ⅛" between the collecting element 13 and the guard 23 was found to be satisfactory. The collecting element had a diameter of 25 mm.

As well as making measurements of the number of ions contacting a predetermined surface or area, the apparatus can also be utilized to obtain a yes or no answer as to whether or not an abnormal number of unipolar ions are present in any area or unconfined space. It also can be utilized for obtaining such an indication from ion producing apparatus as well as measurements of the quantity of ions produced.

Another embodiment of my invention is shown in FIGURE 5 in which the shield 23 of the collecting device is provided with a hood portion 23a which extends over one side of the collecting element to make the collecting device unidirectional. The hood portion 23a prevents collection of ions by one side of the collecting element and, therefore, in making calculations it is only necessary to consider the area of one side of the collecting element. This is particularly advantageous when measuring ion emission from a point source.

It is apparent from the foregoing that I have provided a new and improved ion indicating and measuring apparatus which is particularly useful in making accurate measurements. The apparatus is relatively inexpensive to manufacture and is very simple to use.

I claim:

1. In apparatus for collecting and measuring ions in an electrostatic field in relatively quiet air, a collecting device consisting of a collecting element of conducting material exposed to the air for collecting ions, a shield of conducting material surrounding said element and serving to maintain said collecting element at substantially ground potential to thereby prevent said collecting element from distorting the electrostatic field in the air, said shield permitting the free flow of ions in the air to the collecting element, means connected to said collecting element to give an indication of the ions collected by said collecting element, and means for carrying said collecting element and shield to permit said collecting device to be positioned by hand.

2. In apparatus for collecting and measuring ions in an electrostatic field in relatively quiet air, a collecting device consisting of a mounting member, a collecting element exposed to the air carried by said mounting member for collecting ions, said collecting element being of a conducting material and having a flat surface, an elongate shield member looped about said collecting element and lying in the same plane as the flat surface, said shield member permitting the free flow, a shielded cable having a central conductor and shielding, the central conductor being connected to said collecting element and the shielding being connected to said elongate member, and indicating means connected to said cable to give an indication of the current flow through said central conductor.

3. In apparatus for collecting and measuring ions in an electrostatic field, a collecting device consisting of a member of insulating material, a disc-like collecting element mounted on said member, a wire-like shield looped about said collecting element and lying in the same plane as said collecting element, a shielded cable having a central conductor and shielding, the central conductor being connected to the connecting element and the shielding being connected to the wire-like shield, and means connected to said cable for giving an indication of the ions collected by said collecting element.

4. Apparatus as in claim 3 wherein said shield is provided with a hood-like portion which covers one side of said disc-like collecting element so that ions can only be collected from one direction by collecting element.

5. In apparatus for collecting and measuring ions at atmospheric pressure in relatively quiet air, a collecting element of conducting material exposed to the air for collecting ions, said collecting element having a relatively flat surface of substantial area, means connected to said element to give an indication of whether or not ions are being collected by said collecting element, and means lying in substantially the same plane as the collecting element for preventing said collecting element from distorting any electrostatic field which may be present in the air, said last named means permitting the free flow of ions in the air to the collecting element.

6. In apparatus for collecting and measuring ions in relatively quiet air, a collecting element of conducting material exposed to the air for collecting ions, said collecting element having a relatively flat surface of substantial area, a shield lying in substantially the same plane as the collecting element and extending about said collecting element and serving to maintain said collecting element at substantially ground potential to prevent said collecting element from distorting the electrostatic field and permitting the free flow of ions in the air to the collecting element, and means connected to said element to give an indication of whether or not ions are being collected by the collecting element.

7. Apparauts as in claim 6 wherein said shield is formed so that ions can be collected by the collecting element from only one direction.

8. Apparatus as in claim 6 wherein said collecting element is in the form of a disc-like member.

References Cited in the file of this patent

UNITED STATES PATENTS

| | | |
|---|---|---|
| 2,491,445 | Cunningham et al. | Dec. 13, 1949 |
| 2,531,609 | Bulgin | Nov. 28, 1950 |
| 2,750,562 | Starr | June 12, 1956 |
| 2,782,103 | Prentiss | Feb. 19, 1957 |
| 2,825,872 | Stubbs et al. | Mar. 4, 1958 |
| 2,889,478 | Rogers | June 2, 1959 |